W. A. FOSS.
ARTIFICIAL BAIT.
APPLICATION FILED JULY 31, 1916.
1,265,900.
Patented May 14, 1918.
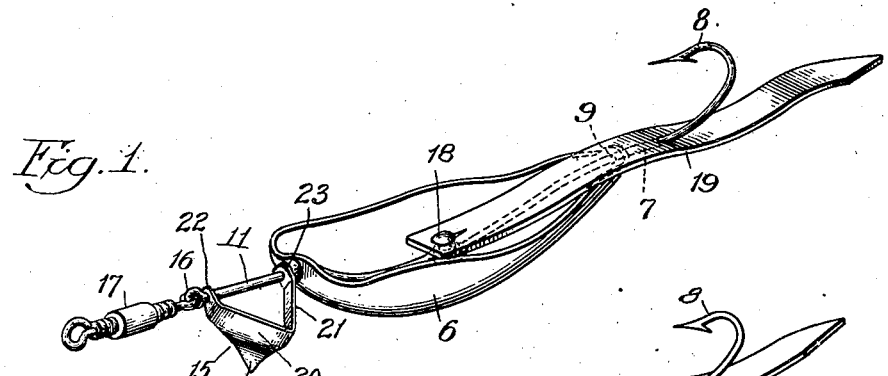
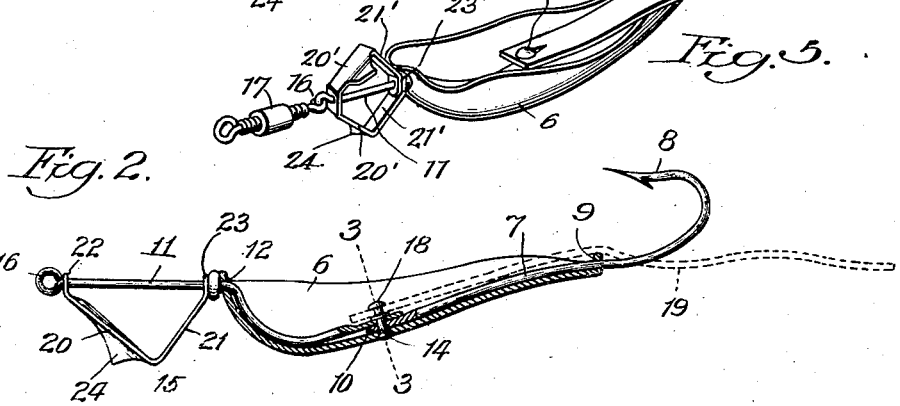
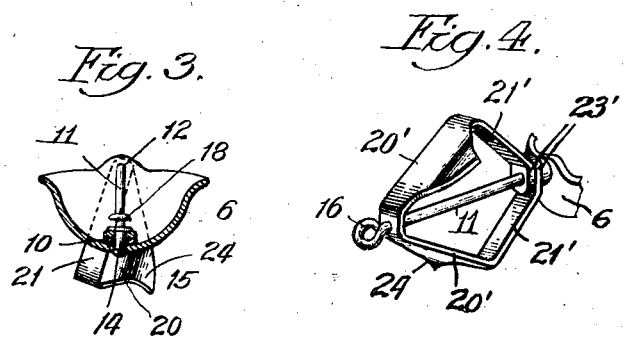
Witness:
John Enders
Inventor:
William A. Foss
by Fred Gerlach
his Atty.

UNITED STATES PATENT OFFICE.

WILLIAM A. FOSS, OF CLEVELAND, OHIO.

ARTIFICIAL BAIT.

1,265,900.  Specification of Letters Patent.  Patented May 14, 1918.

Application filed July 31, 1916. Serial No. 112,224.

*To all whom it may concern:*

Be it known that I, WILLIAM A. FOSS, a citizen of the United States, and a resident of Cleveland, in the county of Cuyahoga and State of Ohio, have invented certain new and useful Improvements in Artificial Bait, of which the following is a full, clear, and exact description.

The invention relates to artificial bait for fishing and more particularly to the kind used in casting or trolling.

In practice, it has been found that a rigid body and a freely flexibly or wiggly tail strip of pork rind can be caused to travel through the water so as to resemble live-bait in appearance. One object of the present invention is to provide an improved artificial bait of this type in which a hollow or spoon shaped body is used in front of the hook and the flexible tail strip of pork rind or the like.

Another object of the invention is to provide an improved spinner which can be made of light or thin material, which is formed so that the water will act on it to cause the bait behind the spinner to wiggle, and which is formed so that the fishing line is not likely to become fouled around it.

The invention consists in the several novel features hereinafter set forth and more particularly defined by claims at the conclusion hereof.

In the drawings: Figure 1 is a perspective of a device embodying the invention. Fig. 2 is a longitudinal section. Fig. 3 is a section taken on line 3—3 of Fig. 2. Fig. 4 is a detail of a modified form of spinner. Fig. 5 is a perspective of a complete device embodying the modified form of spinner shown in Fig. 4.

The improved bait comprises a substantially rigid hollow spoon shaped body 6, the convex portion facing downwardly to resemble a fish-body in appearance. This body is usually formed of polished metal. The shank 7 of a fish hook comprising a prong or hook proper 8 extends through an opening 9 in the rear end of the spoon shaped member and the eye 10 is secured within and to the top of the central lower portion of the spoon-body. A draft rod 11 extends through the bowl 6 in the front of the spoon as at 12, and its rear end is extended to and secured on the top of the central lower portion of the body by a stud 14 which extends through the eye 10 of the hook and also secures the rod 11 and hook rigidly to the bowl. A spinner 15 is swiveled on the rod 11 in front of the spoon and an eye 16 is formed on the front end of the hook for connection to a swivel 17. Stud 14 is provided with a button 18 which is adapted to pass through a small slit in the front end of a flexible strip 19 which is impaled on the fish hook rearwardly of the bowl. This strip comprises a portion disposed in the rear of the bowl which is free to wiggle responsively to vibrations caused by the spinner and the passage of the bait through the water.

The spinner 15 comprises a front portion or member 20 and a rear portion or member 21. The front portion comprises a pivot lug 22 through which the rod 11 passes and the rear member 21 is provided with a similar pivot lug 23 for said rod. The front portion is inclined rearwardly and outwardly from pivot lug 22 and the rear member 21 is inclined rearwardly and inwardly from the outer rear portion of member 22 outwardly and forwardly from pivot lug 23. The front member 20 is provided with a curved wing 24 formed to cause the spinner to rotate as the bait is drawn forwardly through the water. The pivot lugs and both members of the spinner are formed of a single piece of metal and the members are formed to mutually brace each other so that comparatively thin metal may be used. By using a comparatively light spinner, it responds more readily to the action of the water and this results in producing a rapid wiggling effect upon the bait. Furthermore, by employing a rear member which is inclined rearwardly and inwardly from the outer member, the fishing line will be prevented from passing under the front member. That is to say, if in casting the line should be manipulated so that it would be directed inwardly of the front member, the winged front member and the rear member will prevent the line from passing completely under the front member, and will cause the line to be deflected or slip off the spinner.

In practice, the flexible strip usually of thin pork rind is first impaled on the hook and then fastened on button 18, which will cause the front portion of the strip to be held within the bowl leaving the rear portion free to wiggle.

In Fig. 4, a one piece spinner comprises two oppositely disposed front members 20' and two rear members 21' similar in form to the members 20 and 21 in the single blade spinner, and each member 21 has a pivot lug 23' thereon through which rod 11 passes.

The device set forth exemplifies an artificial bait comprising a non-rotating spoon-shaped or hollow body and a freely flexible tail strip which is caused to undulate or wiggle in the water. The hollow body causes the bait and tail strip to remain near the surface of the water so that the bait is particularly adapted for shallow water fishing.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a fishing device, the combination of a concavo-convex body, a fish hook rigidly secured to said body, a substantially flat freely flexible tail strip having its front end extended to lap a portion of said body and extending and free to wiggle rearwardly of the body, means to secure the front end of the strip to the body, and means for causing the extension to wiggle.

2. In a fishing device, the combination of a concavo-convex body having its concave side on the top thereof, a fish hook rigidly secured to said body, a substantially flat freely flexible strip having its front end extended to lap the concave top of the body and extending and free to wiggle rearwardly of the body, means to secure the front end of the strip to the body, and means for causing the rear extension of the strip to wiggle.

3. In a fishing device, the combination of a body, a fish hook secured to the body, a flexible strip, and a stud on the body, provided with a head and to which the front end of the strip is adapted to be secured.

4. In a fishing device, the combination of a fish hook, a rod connected to said hook, and a spinner pivoted on the rod and comprising two front members extending rearwardly and outwardly from the rod and two members extending rearwardly and inwardly from the front members respectively.

5. In a fishing device, the combination of a fish hook and a spinner and connecting means between the hook and the spinner, the latter having the rear portion inclined outwardly and forwardly from the axis of the spinner to prevent a line from being caught thereon.

6. In a fishing device, the combination of a fish hook, a rod connected to said hook, and a spinner comprising two members, one of which extends rearwardly and outwardly from the rod and the other of which extends rearwardly and inwardly from the rear of the front member, both of said members having their inner ends pivotally held on the rod.

7. In a fishing device, the combination of a fish hook, a rod connected to said hook, and a spinner comprising two members, one of which extends rearwardly and outwardly from the rod and is formed with an integral wing for rotating the spinner and the other of which extends rearwardly and inwardly from the rear of the front member, both of said members having their inner ends pivotally held on the rod.

8. In a fishing device, the combination of a fish hook, a rod connected to said hook, and a one-piece spinner comprising two members, one of which extends rearwardly and outwardly from the rod and the other of which extends rearwardly and inwardly from the rear of the front member, both of said members having their inner ends pivotally held on the rod.

9. In a fishing device, the combination of a fish hook, and connected to said hook, and a spinner comprising two members, one of which extends rearwardly and outwardly from the rod and the other which extends reavwardly and inwardly from the rear of the front member, each of said members having an integral pivot-lug at its inner end.

WILLIAM A. FOSS.